Feb. 12, 1924. 1,483,732
J. F. KLEIN
CLEARER OR SHIELD FOR TRACTORS
Filed Oct. 18, 1922
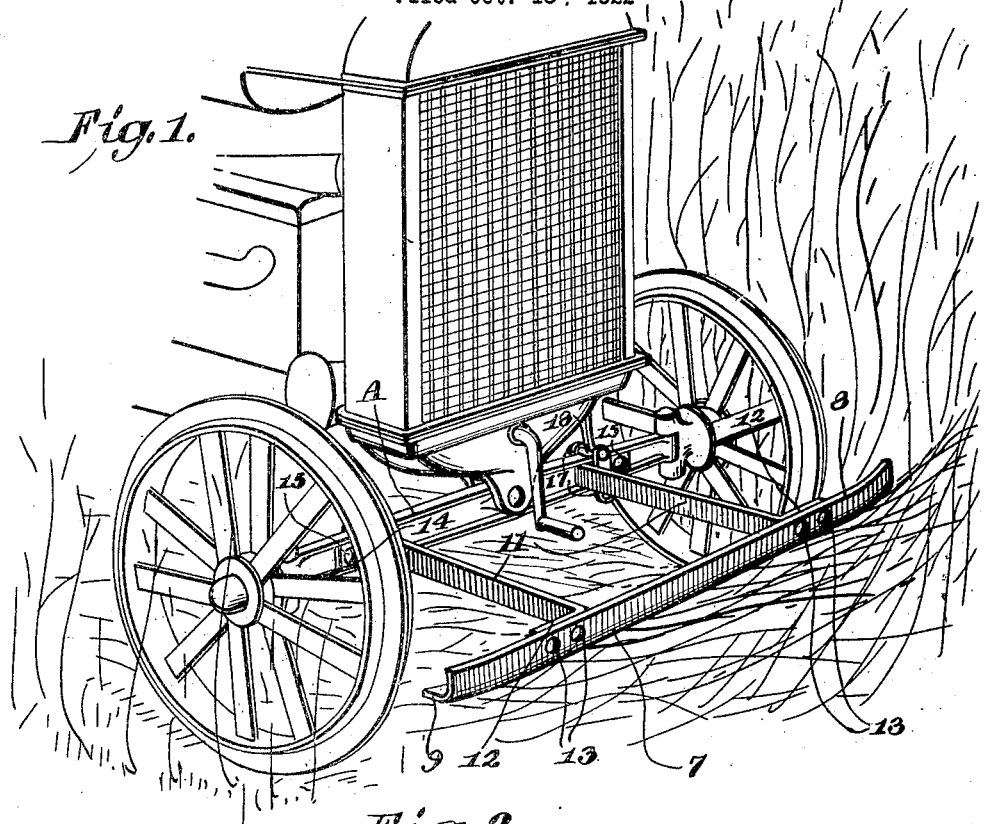
Inventor
John F. Klein
By P. W. Hoagland
Attorney Patented Feb. 12, 1924.

1,483,732

UNITED STATES PATENT OFFICE.

JOHN F. KLEIN, OF WILMINGTON, NORTH CAROLINA.

CLEARER OR SHIELD FOR TRACTORS.

Application filed October 18, 1922. Serial No. 595,343.

*To all whom it may concern:*

Be it known that I, JOHN F. KLEIN, a citizen of the United States, and resident of Wilmington, in the county of New Hanover, State of North Carolina, have invented a new and useful Clearer or Shield for Tractors, of which the following is a specification.

The present invention relates to a shield or clearer for the front end of a tractor so constructed and arranged as to brush down to the ground corn stalks, weeds, brush, and other vegetation, whereby the tractor, when traveling over the ground containing such vegetation or obstructions, will not result in the radiator, wheels and other portions of the machine becoming clogged up by the accumulations of leaves, twigs, seeds, and other foreign matter, as usual when running a tractor over a field containing brush, weeds, and the like.

Another object of the invention is to mount a shield or clearer upon a tractor in such a position in front of the crank of said tractor to eliminate to a great extent, brush, weeds and the like becoming entangled around said crank.

A further object is the provision of such a device which will not only serve the purpose of crushing or breaking down the vegetation, so as to clear a path for the machine, but which will also provide a bumper in order to avoid injury to the machine if an unyielding object is encountered.

A still further object is the provision of novel means for mounting and supporting the device so as to be effective.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein:—

Fig. 1 is a perspective view of the device.

Fig. 2 is a plan view thereof.

Fig. 3 is a section on the line 3—3 of Fig. 2.

Fig. 4 is a section on line 4—4 of Fig. 2.

The device comprises a rigid or stiff shield member 7 extending transversely across the front end of the tractor with its ends in front of the front wheels, and said member 7 is disposed in front of and parallel with the axle A of the machine. The member 7 is of angular cross-section and has the forward upwardly extending flange 8, and the lower rearwardly extending flange 9, with a curved bend between said flanges providing a forwardly and downwardly facing curved surface 10 which enables the member or bar 7 to ride or slide over the crushed or broken down brush, weeds, and the like, without breaking off the leaves, twigs, seeds, and other matter, so as not to loosen same, and thereby preventing such foreign matter from passing into the radiator or other parts of the machine.

The shield member or bar 7 is supported rigidly from the axle so as to break or crush down corn stalks, weeds, brush, and the like, to prevent such objects from becoming entangled in the radiator, crank, wheels, and other parts of the tractor, as usual when running through such vegetation.

In order to rigidly support the member 7 from the front axle A, a pair of rigid brackets 11 are attached to the axle and project forwardly therefrom. Said brackets are formed from bars or strips, with their edges extending upwardly and downwardly. The brackets 11 have their forward terminals bent at an angle away from one another, as at 12, and bearing against the rear surface of the flange 8, and said flange 8 is secured to the portions 12 by means of the bolts 13. The rear terminals of the brackets 11 are also bent at an angle away from one another to fit the front side of the axle A, and said portions 14 are engaged by the bolts 15 which extend through the axle and which fasten the forward ends of the radius rods 16 to the rear side of the axle. The radius rod bolts 15 are thus used for clamping the portions 14 to the axle, and, in addition, clamps embrace the axle and said portions 14 adjacent to the brackets 11. These clamps comprise the vertical bars 17 extending across the portions 14 and rear side of the axle and connected above and below the axle by the clamping bolts 18. The brackets 11 are thus rigidly secured to the axle, and support the shield member or bar 7 rigidly from the axle, whereby said member or bar 7 is sufficiently rigid to crush or break down the vegetation in front of the tractor.

Although the primary function of the device is to crush or break down the vegetation, to prevent same from becoming entangled in or clogging the radiator and other portions of the machine, the device will also serve as a buffer to prevent the machine being damaged when running into an unyielding obstruction.

Having thus described the invention, what is claimed as new is:—

1. The combination with a tractor, of a shield member rigidly supported from the front axle thereof across the front of the tractor and so constructed and arranged as to crush or break down vegetation in front of the tractor.

2. The combination with a tractor, of brackets rigidly secured to the front axle thereof and extending forwardly, and a shield member rigidly carried by said brackets and extending across the front of the tractor for crushing or breaking down vegetation.

3. The combination with a tractor, of a shield member supported from and extending across the front end of the tractor, said member having upwardly and rearwardly extending flanges and a curved bend between said flanges forming a curved surface facing forwardly and downwardly for crushing or breaking down and riding over vegetation in front of the tractor.

4. A device of the character described comprising brackets having angularly extending terminals, a shield member to extend across the front end of a tractor secured to one of said terminals of each bracket, and means for attaching the other terminals of said brackets to the front axle of a tractor.

5. In combination with a tractor including a front axle, radius rods, and bolts securing said radius rods to the axle, of brackets extending forwardly from the axle and having rear angularly extending terminals bearing against the axle and engaging said bolts, a shield member secured to said brackets and extending across the front of the tractor and clamps embracing said terminal portions and axle adjacent to said brackets.

JOHN F. KLEIN.